United States Patent [19]
Klobucar et al.

[11] Patent Number: 5,788,744
[45] Date of Patent: Aug. 4, 1998

[54] RECIRCULATION OF DESORPTION OUTLET FOR ROTARY CONCENTRATOR

[75] Inventors: Joseph M. Klobucar, Detroit; Daniel Blundy, Dewitt, both of Mich.

[73] Assignee: Durr Industries, Inc., Plymouth, Mich.

[21] Appl. No.: 754,541

[22] Filed: Nov. 21, 1996

[51] Int. Cl.$^6$ ............................... B01D 53/06
[52] U.S. Cl. .................. 95/113; 95/114; 95/123; 95/126; 96/123; 96/125; 96/130; 96/144
[58] Field of Search ............ 95/107, 113–115, 95/120, 123, 126; 96/123, 125, 130, 144, 150

[56] References Cited

U.S. PATENT DOCUMENTS

| | | | |
|---|---|---|---|
| 3,757,492 | 9/1973 | Graff | 96/123 |
| 4,846,855 | 7/1989 | Tsujimoto | 95/113 |
| 4,946,479 | 8/1990 | Izumo | 96/123 |
| 4,948,392 | 8/1990 | Rush | 95/123 X |
| 5,017,202 | 5/1991 | Ogata et al. | 96/125 |
| 5,057,128 | 10/1991 | Panzica et al. | 96/125 X |
| 5,385,603 | 1/1995 | Sienack | 96/125 |
| 5,464,468 | 11/1995 | Tanaka et al. | 96/125 |
| 5,584,916 | 12/1996 | Yamashita et al. | 96/125 X |

FOREIGN PATENT DOCUMENTS

| | | | |
|---|---|---|---|
| 2-24156 | 9/1990 | Japan | 96/125 |
| 2112661 | 7/1983 | United Kingdom | 96/144 |

*Primary Examiner*—Robert Spitzer
*Attorney, Agent, or Firm*—Howard & Howard

[57] ABSTRACT

An improved rotary concentrator separates the desorption gas flow into two flow portions. The first flow portion is sent to a final processing system. The second portion is recycled to the rotary concentrator. In a first embodiment, gas is recycled to the process gas inlet. In a second embodiment, the recycled gas is reused as desorption inlet gas. Most preferably, the recirculated gas is relatively clean compared to the gas in the first portion which is sent to the final processing system. In this way, the improved rotary concentrator is more efficient and reduces the amount of gas which must be processed by the final processing system.

14 Claims, 1 Drawing Sheet

5,788,744

1

RECIRCULATION OF DESORPTION OUTLET FOR ROTARY CONCENTRATOR

BACKGROUND OF THE INVENTION

This invention relates to a method of recirculating a portion of the desorption outlet gas in a rotary concentrator to reduce the amount of desorption gas which must be treated at a final processing step.

Rotary concentrator systems are widely utilized to concentrate impurities in industrial air streams for final processing. Federal and state regulations provide strict control over the processing that must be done to an industrial gas stream before it may be returned to the environment. Thus, complex industrial processes are performed on industrial gas streams to remove impurities. One widely utilized type of apparatus and process is a rotary concentrator. In a rotary concentrator, a rotating frame carries a plurality of blocks. An industrial gas stream is passed over the blocks, and the blocks remove impurities from the air. The blocks themselves become contaminated with the impurities. The blocks rotate about an axis and over a portion of a rotational cycle pass through a desorption portion.

In the desorption portion, a super heated gas stream is passed over the blocks to remove the impurities. Thus, the blocks remove impurities from a relatively large gas stream, and the impurities are then concentrated in the relatively small desorption gas stream. The small volume desorption gas stream is then passed for final processing at another industrial gas cleaner.

The prior art rotary concentrator systems are widely utilized and relatively successful. However, it would be desirable to minimize the volume of desorption gas which must be passed for final processing.

SUMMARY OF THE INVENTION

In a disclosed embodiment of this invention, a portion of the desorption gas exhaust is recirculated. Thus, only a portion of the total desorption gas is sent for final processing. In preferred embodiments, the desorption outlet is split on an approximate 50/50 basis. In one embodiment, the recirculated desorption gas is returned to the desorption inlet. In a second embodiment, the desorption gas is recirculated to the inlet of the rotary concentrator as gas to be cleaned in the concentrator.

In either embodiment, it is preferred that the portion of the gas which is recirculated is a portion from the beginning of the desorption cycle. It is most likely that the gas from the beginning of the desorption cycle is less polluted than that from later in the desorption cycle. The desorption cycle must first heat the blocks before it begins to fully clean the blocks. The early desorption gas is thus doing a good deal of the heating, while the later gas does the bulk of the cleaning. For that reason, recirculating the early portion of the desorption gas will result in the bulk of the impurities being in the later portion of the desorption gas, which is still sent for final treatment.

In preferred embodiment of this invention, the outlet of the desorption section is provided with a partition that splits the gas into two flows. The early flow is recirculated while the later flow is sent for final treatment.

These and other features of the present invention can be best understood from the following specification and drawings, of which the following is a brief description.

2

Figure 2:
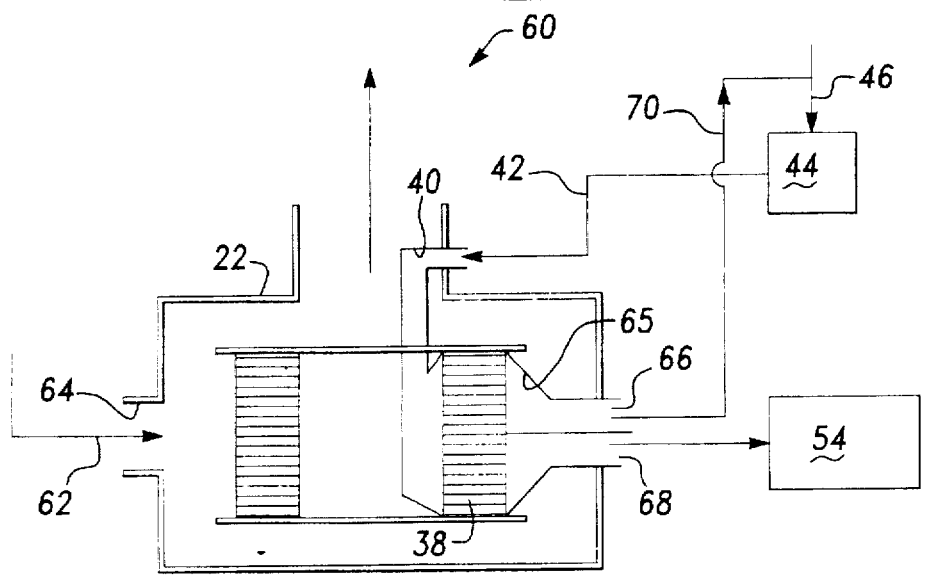

FIG. 2 shows the second embodiment of the present invention.

Figure 3:
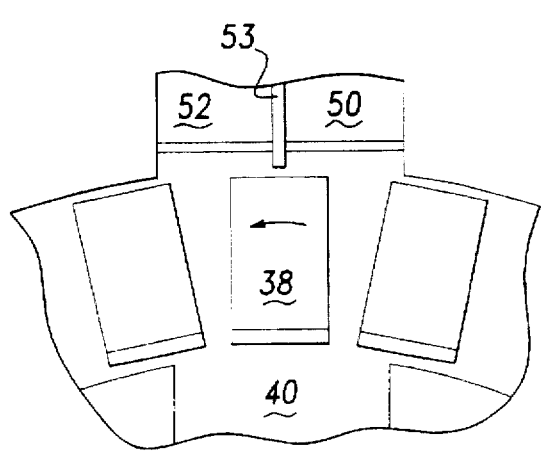

FIG. 3 shows a detail of the partition structure for the desorption outlet of the present invention.

DETAILED DESCRIPTION OF A PREFERRED EMBODIMENT

Figure 1:
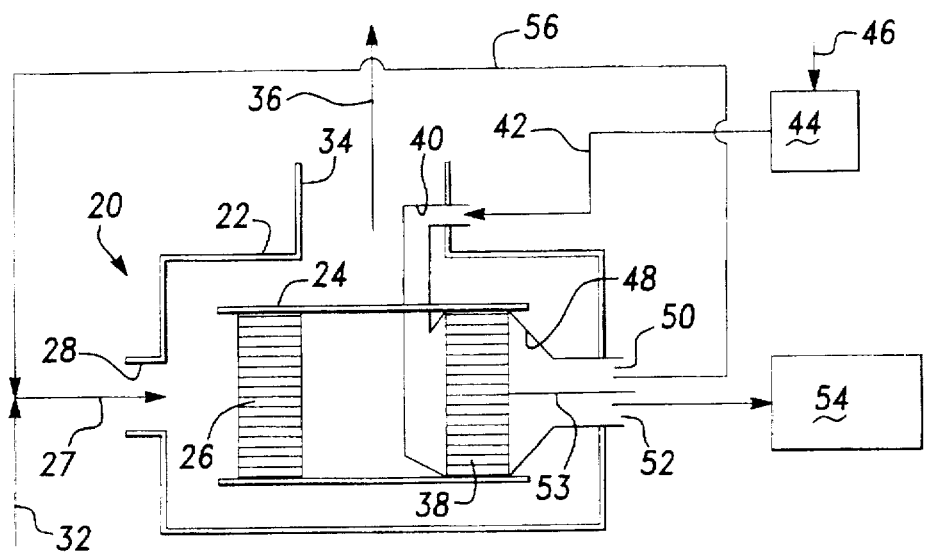
FIG. 1 shows the first embodiment of the present invention.

A rotary concentrator 20 is shown somewhat schematically in FIG. 1. Housing 22 houses a rotating unit 24 which carries a plurality of blocks 26. The blocks are formed of known material and serve to remove impurities from a process gas. The process gas is directed from inlet 27 into an inlet 28 in the housing 22. A source of process gas 32 is connected to the inlet 27. The gas from the inlet 27 passes over the blocks 26, and through an outlet 34 to an exhaust line 36. By passing the process gas over the blocks 26, impurities are removed from the process gas, and the air sent through the outlet 36 is relatively clean. The blocks 26, however, become contaminated.

A block 38 is shown in a desorption portion wherein it is cleaned by gas injected into a desorption inlet 40. Desorption gas inlet 42 is communicated to a heating system 44, which heats a source of desorption gas 46. The gas is heated by heater 44, which may be a known heater as utilized in this type system. The gas from inlet 42 heats block 38 to clean the block. The invention as described to this point is as known in the art.

The invention relates to the exhaust 48 of the desorption system. As shown, exhaust 48 is split into two portions 50 and 52 by a partition 53. In fact, as will be explained below, the partition is preferably actually positioned 90° from that which is shown in this figure. However, for purposes of understanding the system, the partition is shown as orientated in FIG. 1. Gas from the portion 52 is directed to a final control device 54. The final control device may be any one of several types of known gas processing systems.

Gas from the recirculation segment 50 is passed through a line 56 back to the inlet 27. Now, a portion of the gas is recirculated and directed in as process gas flow.

Systems of this type may process on the order of 50,000 cubic feet per minute at inlet 27. In a system of that approximate size, the desorption inlet 42 may carry approximately 5,000 cubic feet per minute. With such a system, it is preferred that the desorption exhaust in section 52 be approximately half, or 2500 cubic feet per minute. Similarly, the gas directed in line 56 back to the inlet 27 is approximately 2500 cubic feet per minute. With this system, the process from gas line 32 will only be 47,500 cubic feet per minute. These numbers are of course approximate, and should not be seen as limiting the invention.

With this invention, the amount of gas which must be handled by the final control device 54 is cut in half. This increases the efficiency of the system, and decreases the cost.

A second embodiment 60 is shown in FIG. 2. Process gas 62 is directed into an inlet 64. The desorption outlet 65 is split into sections 66 and 68. Section 68 is again sent to the final processing system 54. The portion 66 is recirculated through line 70 into the desorption inlet source 46, and heated. That gas is then returned through line 42 to the desorption inlet. Again, the gas that must be processed by the final treatment system 54 is cut in half.

In a preferred system, it is desirable that the portion which is recirculated is the cleaner half of the absorption gas. As shown in FIG. 3, the portions 52 and 50 are divided by the partition wall 53. The same is true of portions 66 and 68. The system as shown in this figure rotates counterclockwise. Portion 50 is thus positioned upstream of portion 52. The heated desorption gas heats the block 38 in the early portions which are directed to portion 50. Then, having heated the block 38, the gas generally begins carrying the polluted contaminates out during portion 52. There will be contaminants in portion 50, however, they will be much more concentrated in portion 52. By segregating the portion 52 and sending it to the final cleaning process, a much more highly concentrated gas stream is processed. The gas which is recirculated would tend to be cleaner, and it would thus reduce the efficiency of the overall final cleaning system to clean that relatively cleaner gas.

With this feature of the invention, the system not only concentrates the impurities from the process inlet to the system itself, but also concentrates the impurities within the desorption gas to reduce the amount of gas which must be handled by the final process system.

Preferred embodiments of this invention have been disclosed, however, a worker of ordinary skill would recognize certain variations would come within the scope of this invention. For that reason the following claims should be studied to determine the true scope and content of this invention.

We claim:

1. A method of cleaning a gas comprising the steps of:

(a) providing a rotary concentrator system including a rotating member housing a plurality of blocks, and a process gas inlet for directing gas over said blocks over a majority of cycle of said rotating member, providing a desorption system for passing a heated gas over said blocks over a limited portion of a rotational cycle of said rotating member;

(b) passing process gas over said blocks as said rotating member rotates, and passing heated gas over said blocks in said limited portion, directing said heated gas from said blocks to a desorption outlet; and (c) separating said desorption outlet into at least two portions with gas in a first portion being sent to a final processing system, and gas in a second portion being recirculated to said rotary concentrator.

2. A method as recited in claim 1, wherein said gas in said second portion is recirculated to said process inlet.

3. A method as recited in claim 1, wherein said recirculated gas is recirculated to a desorption inlet to pass over said blocks.

4. A method as recited in claim 3, wherein said recirculated gas passes through a heating system and is heated prior to being sent to said desorption system.

5. A method as recited in claim 4, wherein said desorption inlet received approximately half of its gas from recirculation, and another half of its gas from a second source.

6. A method as recited in claim 1, wherein said first and second portions of said desorption outlet each carry approximately one-half the gas from said desorption outlet.

7. A method as recited in claim 1, wherein said first portion is taken from a downstream location and said second portion is taken from a location upstream of said first portion.

8. A rotary concentrator comprising:

a rotating unit having a rotational cycle, and housing a plurality of blocks;

a process gas inlet to direct process gas to said rotating unit and over said blocks;

a desorption system for passing a heated gas over said blocks over a limited portion of the rotational cycle of said rotating unit, said desorption system including an outlet for receiving desorption gas which has passed over said blocks, and said desorption outlet being partitioned into at least two portions, with a first portion directed to a final processing system, and a second portion being recirculated to said rotary concentrator.

9. A rotary concentrator as recited in claim 8, wherein a partition wall divides said outlet into said two portions to provide said partitioned outlet.

10. A rotary concentrator as recited in claim 8, wherein said recirculated portion is recirculated to said process gas inlet.

11. A rotary concentrator as recited in claim 8, wherein said recirculated portion is recirculated to a desorption inlet.

12. A rotary concentrator as recited in claim 11, wherein said recirculated desorption outlet is recirculated through a heating system for heating said desorption gas prior to being delivered to said rotary concentrator.

13. A rotary concentrator as recited in claim 8, wherein each of said portions handle approximately equal amounts of said desorption outlet gas.

14. A rotary concentrator as recited in claim 8, wherein said first portion is positioned from said second portion in a direction of rotation of said rotating unit.

\* \* \* \* \*